(12) United States Patent
Maeda

(10) Patent No.: US 11,047,325 B2
(45) Date of Patent: Jun. 29, 2021

(54) CONTROL DEVICE OF INTERNAL COMBUSTION ENGINE

(71) Applicant: TOYOTA JIDOSHA KABUSHIKI KAISHA, Toyota (JP)

(72) Inventor: Shingo Maeda, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/552,162

(22) Filed: Aug. 27, 2019

(65) Prior Publication Data
US 2020/0088120 A1    Mar. 19, 2020

(30) Foreign Application Priority Data

Sep. 14, 2018 (JP) .............................. JP2018-172529

(51) Int. Cl.
*F02D 41/14* (2006.01)
*G05B 13/02* (2006.01)
*F02D 45/00* (2006.01)
(Continued)

(52) U.S. Cl.
CPC ....... *F02D 41/1405* (2013.01); *F02D 41/221* (2013.01); *F02D 41/222* (2013.01); *F02D 41/2438* (2013.01); *F02D 45/00* (2013.01); *G05B 13/02* (2013.01); *G05B 13/027* (2013.01); *G06N 3/0481* (2013.01); *G06N 3/082* (2013.01); *G06N 3/084* (2013.01); *F02D 41/248* (2013.01);
(Continued)

(58) Field of Classification Search
CPC ............... F02D 41/1405; F02D 41/222; F02D 41/2438; G05B 13/02; G05B 13/027; G06N 3/0481; G06N 3/082; G06N 3/084
See application file for complete search history.

(56) References Cited

U.S. PATENT DOCUMENTS 5,925,089 A * 7/1999 Fujime ................ F02D 41/1401
701/106
5,954,783 A * 9/1999 Yamaguchi ........... F02D 41/047
123/480
(Continued)

FOREIGN PATENT DOCUMENTS

JP          04199259 A  *  7/1992
JP        H10-331701 A     12/1998
(Continued)

*Primary Examiner* — John M Zaleskas
(74) *Attorney, Agent, or Firm* — Oliff PLC

(57) ABSTRACT

A control device of an internal combustion engine includes: a parameter value acquiring part acquiring values of input parameters; a computing part utilizing a model using a neural network to calculate a value of an output parameter, and a control part controlling operation of the engine. The model outputs the value of the output parameter from an output layer node if the values of the input parameters are input to the input layer nodes. When an abnormality occurs at values of part of the input parameters among the input parameters, the computing part uses the corrected model to calculate the value of the output parameter, the corrected model being provided by correcting the model so that a value changing in accordance with a value of an abnormal input parameter is not input from a input layer node corresponding to the abnormal input parameter to a hidden layer node.

2 Claims, 10 Drawing Sheets

(51) Int. Cl.
  *G06N 3/08* (2006.01)
  *F02D 41/24* (2006.01)
  *F02D 41/22* (2006.01)
  *G06N 3/04* (2006.01)
(52) U.S. Cl.
  CPC ...... *F02D 41/2445* (2013.01); *F02D 41/2487* (2013.01); *F02D 2041/1425* (2013.01); *F02D 2041/1433* (2013.01)

(56) References Cited

U.S. PATENT DOCUMENTS

| | | | | |
|---|---|---|---|---|
| 6,032,139 | A * | 2/2000 | Yamaguchi | F02D 41/1401 706/13 |
| 6,092,017 | A * | 7/2000 | Ishida | F02D 41/1404 701/106 |
| 6,098,012 | A * | 8/2000 | Stander | F02D 37/02 123/406.47 |
| 6,324,529 | B1 * | 11/2001 | Kamihira | F02D 41/1401 706/13 |
| 6,405,122 | B1 * | 6/2002 | Yamaguchi | F02D 41/1404 701/106 |
| 2003/0216855 | A1 * | 11/2003 | Liang | F01N 3/208 701/114 |
| 2004/0078095 | A1 * | 4/2004 | Mizutani | G05B 13/0265 700/28 |
| 2004/0230368 | A1 * | 11/2004 | Kropinski | G05B 23/024 701/114 |
| 2007/0233326 | A1 * | 10/2007 | Jayachandran | F02D 41/1405 701/1 |
| 2009/0018752 | A1 * | 1/2009 | Prunier | G05B 13/027 701/103 |
| 2018/0174025 | A1 | 6/2018 | Jin | |
| 2019/0242318 | A1 * | 8/2019 | Kitagawa | G06N 3/084 |
| 2019/0325671 | A1 * | 10/2019 | Takasu | F02D 41/1405 |
| 2020/0108815 | A1 * | 4/2020 | Nakamura | G06N 3/04 |
| 2020/0109678 | A1 * | 4/2020 | Nakamura | F02D 41/3005 |
| 2020/0271069 | A1 * | 8/2020 | Muto | F02D 41/2461 |

FOREIGN PATENT DOCUMENTS

| | | | |
|---|---|---|---|
| JP | 2012-14617 A | 1/2012 | |
| JP | 5377656 B2 | 12/2013 | |
| WO | WO-9605421 A1 * | 2/1996 | ........ F02D 41/1473 |
| WO | 2011/033662 A1 | 3/2011 | |

* cited by examiner

CONTROL DEVICE OF INTERNAL COMBUSTION ENGINE

FIELD

The present disclosure relates to a control device of an internal combustion engine.

BACKGROUND

Known in the past has been a control device of an internal combustion engine utilizing a trained model using a neural network, in which parameters showing an operating state of the internal combustion engine are used as input parameters and control parameters of the internal combustion engine are used as an output parameter, so as to calculate a value of the output parameter, and controlling the internal combustion engine based on the calculated value of the output parameter (for example, PTL 1).

In particular, the control device of PTL 1 is provided with a plurality of different neural networks and is configured so that each neural network handles a different operating region of the internal combustion engine. In addition, the output values of these neural networks are multiplied with weight coefficients changing according to the transitory operating state of the internal combustion engine to calculate the value of the control parameter, and the internal combustion engine is controlled so that the actual value of the control parameter matches the calculated value of the control parameter.

CITATION LIST

Patent Literature

[PTL 1] WO2011/033662

SUMMARY

Technical Problem

In this regard, the values of at least part of the input parameters to a neural network used for control of an internal combustion engine are often detected by various sensors provided at the internal combustion engine. In addition, part of the input parameters are command values for various actuators provided at the internal combustion engine. In this regard, however, sometimes these sensors or actuators break down. In this case, the sensors cannot be used to detect the actual accurate values of the input parameters. Further, the command values to the actuators and the operations at the actual actuators will differ.

If in this way a breakdown of a sensor or actuator causes an abnormality in a value of an input parameter, if utilizing the trained model using the neural network to calculate the value of the output parameter as it is, a large gap will occur between the calculated value and actual value (or the optimal value) of the output parameter. As a result, if controlling the internal combustion engine based on the output parameter, the internal combustion engine will no longer be operated in the optimal state.

In consideration of the above technical problem, an object of the present disclosure is to provide a control device of an internal combustion engine able to relatively accurately calculate a value of an output parameter even if an abnormality occurs in values of part of the input parameters.

Solution to Problem

The present invention was made so as to solve the above problem and has as its gist the following.

(1) A control device of an internal combustion engine, comprising:
a parameter value acquiring part acquiring values of input parameters showing an operating state of the internal combustion engine;
a computing part utilizing a model using a neural network which comprises a plurality of layers including a input layer, a hidden layer, and an output layer so as to calculate a value of an output parameter when values of the input parameters are input thereto; and
a control part controlling operation of the internal combustion engine based on the value of the output parameter calculated by the computing part,
wherein the model is configured to output the value of the output parameter from a node of the output layer if the values of the input parameters are input to the nodes of the input layer and to receive as input at each node of the input layer the value of one input parameter different from the input parameters input to other nodes of the input layer, and
when an abnormality occurs at values of part of the input parameters among the input parameters, the computing part uses the corrected model to calculate the value of the output parameter, the corrected model being provided by correcting the model so that a value changing in accordance with a value of an abnormal input parameter in which an abnormality arises is not input from a node of the input layer corresponding to the abnormal input parameter to a node of the hidden layer.

(2) The control device of the internal combustion engine according to above (1), further comprising:
a storage part storing a plurality of relationships of values of all of the input parameters and a value of the output parameter as sets of training data; and
a learning part training the corrected model,
wherein the learning part uses the plurality of sets of training data stored in the storage part to train the corrected model.

(3) The control device of the internal combustion engine according to above (1), further comprising:
an output parameter detection device detecting or estimating the value of the output parameter; and
a learning part training the corrected model,
wherein the learning part uses the values of the input parameters acquired by the parameter value acquiring part and the value of the output parameter detected or estimated by the output parameter detection device at this time, as the training data, to train the corrected model.

(4) The control device of the internal combustion engine according to above (1), further comprising
a communication part communicating with a server provided outside of the vehicle at which the internal combustion engine is mounted,
wherein the server further comprises: a storage part storing a plurality of relationships of values of all of the input parameters and a value of the output parameter as sets of training data; and a learning part training the corrected model,
the learning part uses the plurality of sets of training data stored in the storage part to train the corrected model and sends the corrected model trained by the learning part to the vehicle through the communication part, and
the computing part utilizes the trained corrected model to calculate the value of the output parameter when an abnormality occurs in values of part of the input parameters.

(5) The control device of the internal combustion engine according to above (1), further comprising:
an output parameter detection device detecting or estimating the value of the output parameter, and
a communication part communicating with a server provided at the outside of the vehicle in which the internal combustion engine is mounted,
wherein the server comprises: a server side parameter value acquiring part acquiring through the communication part the values of the input parameters and the value of the output parameter detected or estimated by the output parameter detection device; and a learning part training the corrected model,
the learning part uses the values of the input parameters acquired by the server side parameter value acquiring part and the value of the output parameter as training data to train the corrected model, and sends the corrected model trained by the learning part to the vehicle through the communication part, and
the computing part utilizes the trained corrected model to calculate the value of the output parameter when an abnormality occurs in values of part of the input parameters.

Advantageous Effects of Invention

According to the present disclosure, there is provided a control device of an internal combustion engine able to relatively accurately calculate the value of an output parameter even in the case where an abnormality occurs in the values of part of the input parameters.

DESCRIPTION OF EMBODIMENT

Figure 1:
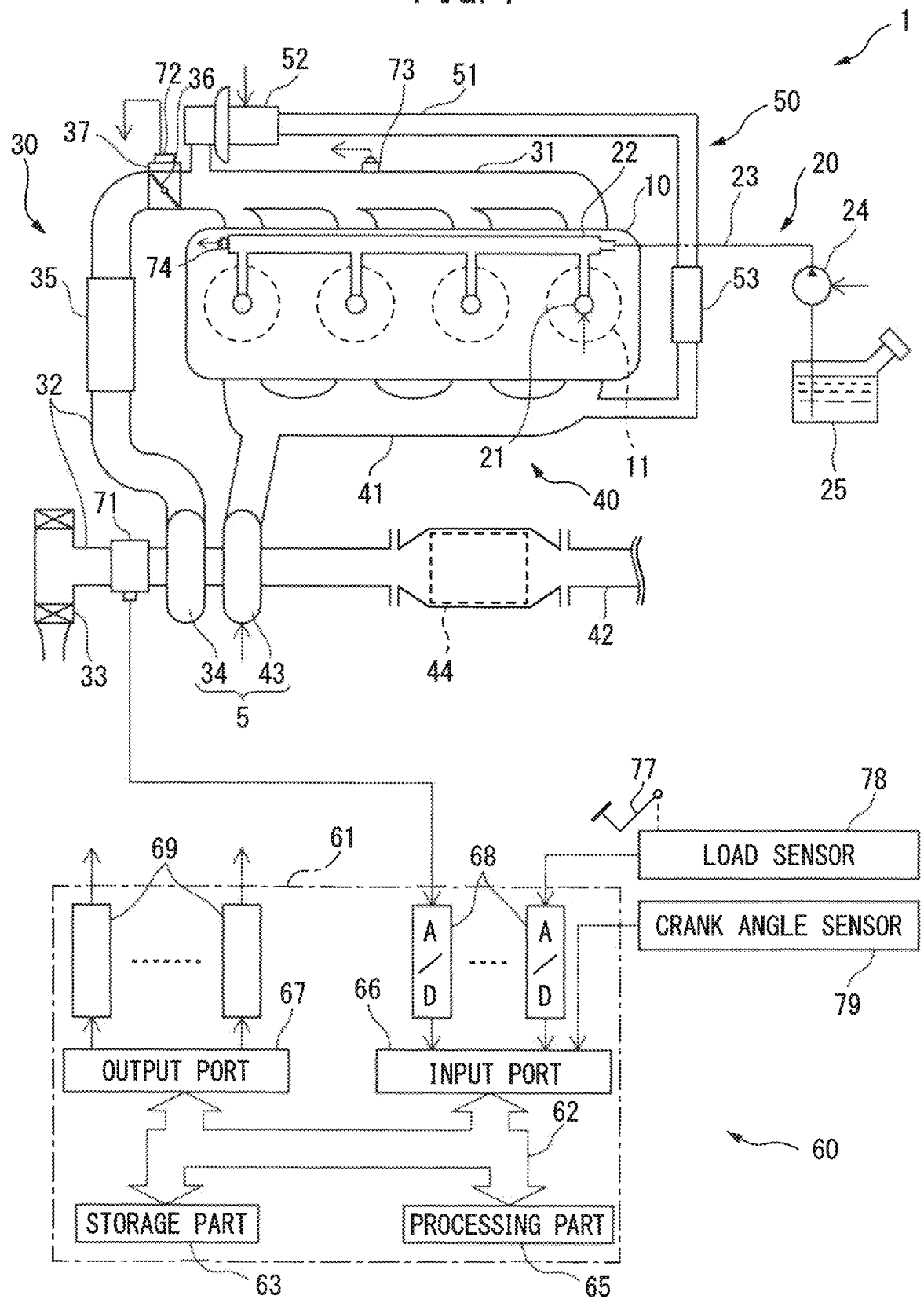
FIG. 1 is a schematic view of the configuration of an internal combustion engine.

Below, referring to the drawings, embodiments of the present invention will be explained in detail. Note that, in the following explanation, similar component elements are assigned the same reference numerals.

First Embodiment

<<Explanation of Internal Combustion Engine as a Whole>>

First, referring to FIG. 1, the configuration of an internal combustion engine 1 in which a control device according to the first embodiment is used, will be explained. FIG. 1 is a schematic view of the configuration of the internal combustion engine 1 mounted on a vehicle. As shown in FIG. 1, the internal combustion engine 1 is provided with an engine body 10, fuel feed system 20, intake system 30, exhaust system 40, exhaust gas recirculation (EGR) system 50, and control device 60.

The engine body 10 is provided with a cylinder block in which a plurality of cylinders 11 are formed, a cylinder head in which intake ports and exhaust ports are formed, and crank case. In each cylinder 11, a piston 14 is arranged, and each cylinder 11 is communicated with the intake ports and the exhaust ports.

The fuel feed system 20 is provided with fuel injectors 21, a common rail 22, fuel feed pipe 23, fuel pump 24, and fuel tank 25. Each fuel injector 21 is arranged in the cylinder head so as to directly inject fuel into a combustion chamber of a cylinder 11. The fuel injector 21 is communicated through the common rail 22 and fuel feed pipe 23 to the fuel tank 25. At the fuel feed pipe 23, the fuel pump 24 is arranged for pumping out fuel in the fuel tank 25. The fuel pumped out by the fuel pump 24 is supplied through the fuel feed pipe 23 to the common rail 22, and fuel is directly injected from the fuel injector 21 into the combustion chambers of the cylinders 11. Note that the fuel injector 21 may be configured to inject fuel into the intake port. The fuel pressure in the common rail 22 is adjusted by changing the output of the fuel pump 24. Therefore, the fuel pump 24 functions as a fuel pressure control device for controlling the fuel pressure supplied to the fuel injector 21.

The intake system 30 is provided with an intake manifold 31, intake pipe 32, air cleaner 33, compressor 34 of an exhaust turbocharger 5, intercooler 35, and throttle valve 36. The intake port of each cylinder 11 is communicated through the intake manifold 31 and the intake pipe 32 to the air cleaner 44. The intake pipe 32 is provided with the compressor 34 of the exhaust turbocharger 5 compressing and discharging intake air flowing through the intake pipe 43 and the intercooler 35 cooling the air compressed by the compressor 34. The throttle valve 36 can change the open area of the intake passage by being turned by a throttle valve drive actuator 37.

The exhaust system 40 is provided with an exhaust manifold 41, exhaust pipe 42, turbine 43 of the exhaust turbocharger 5, and particulate filter (hereinafter, simply referred to as "filter") 44. The exhaust port of each cylinder 11 is communicated through the exhaust manifold 41 and the exhaust pipe 52 to the filter 44. At the exhaust pipe 42, the turbine 43 of the exhaust turbocharger 5 is provided. The turbine 43 is driven to rotate by the energy of the exhaust gas. If the turbine 43 of the exhaust turbocharger 5 is driven to rotate, along with this, the compressor 34 rotates and, accordingly, the intake air is compressed. In the present embodiment, variable nozzles are provided with the turbine 43 of the exhaust turbocharger 5. If the opening degree of the variable nozzles is changed, the flow rate of the exhaust gas supplied to the turbine blade is changed, and therefore the rotational speed of the turbine 43 is changed.

The filter 44 traps particulate matter in the exhaust gas. Note that the exhaust system 40 may be provided with another exhaust purification device, as long as the device can clean exhaust gas and then discharge the exhaust gas to the outside air, instead of or in addition to the filter 44. Such an exhaust purification device 44 includes, for example, NOx selective reduction catalyst, NOx storage reduction catalyst, and oxidation catalyst, etc.

An EGR system 50 supply part of exhaust gas flowing out from the engine body 10 into the intake passage. The EGR system 50 is provided with an EGR pipe 51, EGR control valve 52, and EGR cooler 53. The EGR pipe 51 is connected to the exhaust manifold 41 and intake manifold 31, and connect these together. At the EGR pipe 51, the EGR cooler 53 is provided for cooling EGR gas flowing through the EGR pipe 51. In addition, at the EGR pipe 51, the EGR control valve 62 able to change the open area of an EGR passage formed by the EGR pipe 61, is provided. By controlling the opening degree of the EGR control valve 52, the amount of flow of EGR gas recirculating from the exhaust manifold 41 to the intake manifold 31 is adjusted, and therefore an EGR rate is changed. Note that the EGR rate is a ratio of an amount of EGR gas with respect to the total amount of gas supplied to the combustion chamber (total amount of the fresh gas amount and EGR gas amount).

Note that an exhaust turbocharger 5 is used as a supercharger for raising a pressure of intake gas. However, another type of supercharger, such as an electric compressor or mechanical turbocharger, can be used, as long as it can raise pressure of intake gas.

<<Control Device of Internal Combustion Engine>>

The control device 60 is provided with an electronic control unit (ECU) 61 and various types of sensors. The ECU 61 is comprised of a digital computer and is provided with components, such as a memory 63, processing part 65 including CPU (microprocessor), input port 66, and output port 67, which are connected with each other through a bidirectional bus 62. The memory includes a volatile memory (for example, RAM) and a non-volatile memory (for example, ROM), and memorizes various data, such as a program executable at the processing part 65.

At the intake pipe 32, at the upstream side of the compressor 34 of the exhaust turbocharger 5 in the direction of flow of intake, an air-flow meter 71 is provided for detecting the amount of flow of air flowing through the intake pipe 32. At the throttle valve 36, a throttle opening degree sensor 72 is provided for detecting its opening degree (throttle opening degree). In addition, at the intake manifold 31, a pressure sensor (hereinafter, referred to as "supercharging pressure sensor") 73 is provided for detecting the pressure of the intake gas in the intake manifold 31 (supercharging pressure). Further, at the common rail 22, a pressure sensor (hereinafter, referred to as "fuel pressure sensor") 74 is provided for detecting the pressure of fuel in the common rail 22, i.e., the pressure of fuel supplied to the fuel injector 21. The outputs of the air flow meter 71, throttle opening degree sensor 72, and supercharging pressure sensor 73 and fuel pressure sensor 74 are input through corresponding AD converters 68 to the input port 66.

Further, a load sensor 78 generating an output voltage proportional to the amount of depression of an accelerator pedal 77 is connected to the accelerator pedal 77. The output voltage of the load sensor 78 is input through a corresponding AD converter 68 to the input port 66. Therefore, in the present embodiment, the amount of depression of the accelerator pedal 77 is used as the engine load. A crank angle sensor 79 generates an output pulse every time the crankshaft of the engine body 10 rotates by for example 10 degrees. This output pulse is input to the input port 66. At the CPU 65, the engine speed is calculated from the output pulse of this crank angle sensor 79.

On the other hand, the output port 67 of the ECU 61 is connected through corresponding driver circuits 69 to the actuators controlling the operation of the internal combustion engine 1. In the example shown in FIG. 1, the output port 67 is connected to variable nozzle of the exhaust turbocharger 5, the fuel injectors 21, fuel pump 24, throttle valve drive actuator 37, and EGR control valve 52. The ECU 61 outputs control signals controlling these actuators from the output port 67 to control the operation of the internal combustion engine 1.

Figure 2:
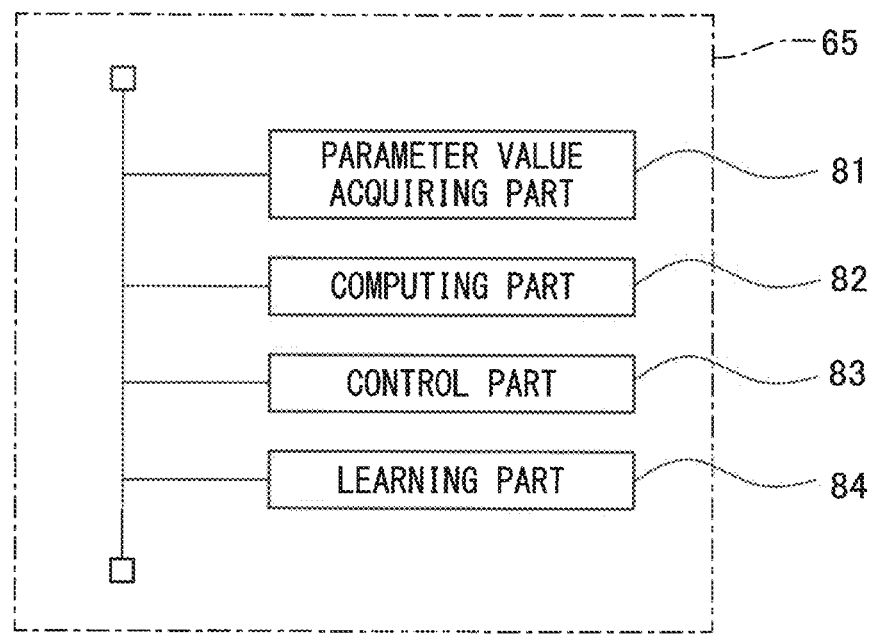
FIG. 2 is a functional block diagram in a processing part of an ECU.

FIG. 2 is a functional block diagram of the processing part 65 of the ECU 61. As shown in FIG. 2, in the present embodiment, the processing part 65 is provided with a parameter value acquiring part 81, computing part 82, control part 83, and learning part 84.

The parameter value acquiring part 81 acquires values of input parameters showing the operating state of the internal combustion engine 1. Specifically, the parameter value acquiring part 81 acquires the outputs of various sensors through the input port 66 of the ECU 61 as values of input parameters showing the operating state of the internal combustion engine 1. Further, the parameter value acquiring part 81 acquires command values of the fuel injector 21 from the ECU 61, etc., as values of input parameters showing the operating state of the internal combustion engine 1. Therefore, in the present embodiment, the parameter value acquiring part 81 functions as an input parameter value acquiring part acquiring the values of the input parameters.

The computing part 82 utilizes, when values of input parameters are input thereto, a model using a neural network which is provided with a plurality of layers including an input layer, hidden layers, and output layer, to calculate the value of an output parameter representing the performance of the internal combustion engine 1. Below, the explanation will be given with reference to the example of the case where the output parameter of the computing part 82 is the concentration of NOx in the exhaust gas, but the output parameter of the computing part 82 may be the concentration of another substance in the exhaust gas, the output torque of the internal combustion engine, the fuel efficiency of the internal combustion engine 1, and/or various other parameters. Alternatively, the output parameter of the computing part 82 may be a parameter for controlling the internal combustion engine 1 (for example, judgment of whether to perform fuel cut control, etc.).

The control part 83 controls the operation of the internal combustion engine 1 based on the value of the output parameter calculated by the computing part 82. For example, when a predicted value of the NOx concentration calculated by the computing part 82 is higher than a target concentration, the target opening degree of the EGR control valve 52 is corrected to become larger so as to lower the NOx concentration. On the other hand, when the predicted value of the NOx concentration calculated by the computing part 82 is lower than the target concentration, the target opening degree of the EGR control valve 52 is corrected to become smaller so as to raise the NOx concentration.

The learning part 84 trains the model used when the computing part 82 calculates the value of the output parameter. The specific training method performed at the learning part 84 will be explained later.

<<Summary of Neural Network>>

As explained above, the computing part 82 in the present embodiment is designed to utilize a model using a neural network to calculate values of various parameters expressing the performance of the internal combustion engine (output parameters). Below, referring to FIG. 3, the neural network used in the computing part 82 will be explained.

Figure 3:
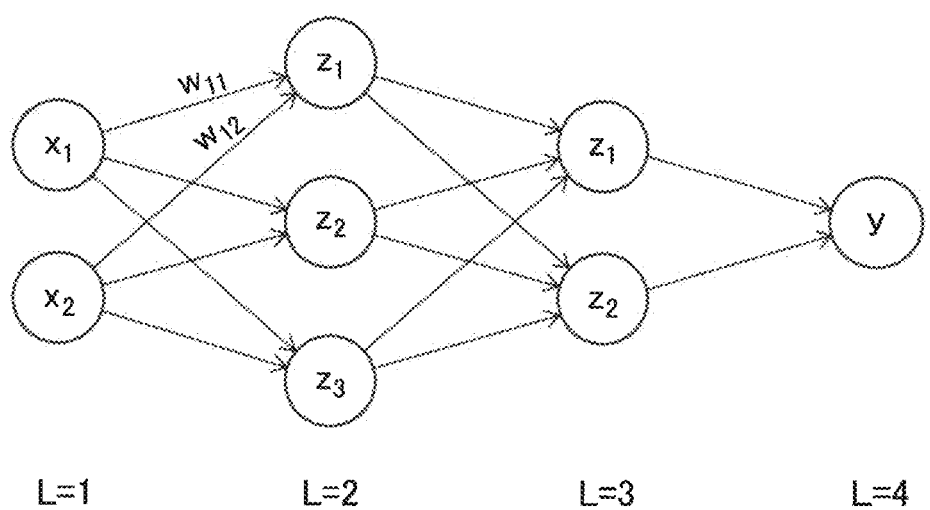
FIG. 3 is a view showing an example of a neural network.

FIG. 3 shows one example of a neural network. The circle marks in FIG. 3 show artificial neurons. In the neural network, such an artificial neuron is usually called a "node" or "unit" (in this Description, called a "node"). In FIG. 3, L=1 indicates an input layer, L=2 and L=3 indicate hidden layers, and L=4 indicates an output layer. Further, in FIG. 3, $x_1$ and $x_2$ indicate nodes of the input layer (L=1) and the output values from those nodes, while "y" indicates a node of the output layer (L=4) and its output value. Similarly, $z_1^{(L=2)}$, $z_2^{(L=2)}$, and $z_3^{(L=2)}$ indicate nodes of the hidden layer (L=2) and the output values from those nodes, and $z_1^{(L=3)}$ and $z_2^{(L=3)}$ indicate nodes of the hidden layer (L=3) and the output values from the nodes. Note that, the number of the hidden layers may be a single or any number, while the number of nodes of the input layer and number of nodes of the hidden layers may also be any numbers. Note that, in the present embodiment, there is a single node in the output layer.

At each of the nodes of the input layer, the input is output as it is. On the other hand, at each of the nodes of the hidden layer (L=2), the output values $x_1$ and $x_2$ of the nodes of the input layer are input. At the nodes of the hidden layer (L=2), respectively corresponding weights "w" and biases "b" are used to calculate the total input values "u". For example, in FIG. 3, a total input value $u_k^{(L=2)}$ calculated at a node shown by $z_k^{(L=2)}$ (k=1, 2, 3) of the hidden layer (L=2) is represented in the following equation (M is number of nodes of input layer):

$$u_k^{(L=2)} = \sum_{m=1}^{M} (x_m \cdot w_{km}^{(L=2)}) + b_k$$

Next, this total input value $u_k^{(L=2)}$ is converted by an activation function "f", and the output from the node shown by $z_k^{(L=2)}$ of the hidden layer (L=2) as the output value $z_k^{(L=2)}$ (=$f(u_k^{(L=2)})$). On the other hand, at each node of the hidden layer (L=3), the output values $z_1^{(L=2)}$, $z_2^{(L=2)}$, and $z_3^{(L=2)}$ of the nodes of the hidden layer (L=2) are input. At the nodes of the hidden layer (L=3), the respectively corresponding weights "w" and biases "b" are used to calculate the total input values "u" (=$\Sigma z \cdot w + b$). The total input values "u" are similarly converted by an activation function, and then output from the nodes of the hidden layer (L=3) as the output values $z_1^{(L=3)}$ and $z_2^{(L=3)}$. Note that, in the present embodiment, a Sigmoid function σ is used as this activation function.

On the other hand, the output values $z_1^{(L=3)}$ and $z_2^{(L=3)}$ of the nodes of the hidden layer (L=3) are input to the node of the output layer (L=4). At the node of the output layer, the corresponding weight "w" and bias "b" are used to calculate the total input value "u" ($\Sigma z \cdot w + b$), or only the corresponding weight "w" is used to calculate the total input value "u" ($\Sigma z \cdot w$). In the present embodiment, at the node of the output layer, an identity function is used as the activation function. Therefore, from the node of the output layer, the total input value "u" calculated in the node of the output layer is output as is as the output value "y".

<<Training at Neural Network>>

In the present embodiment, the backpropagation method is used for learning the values of the weights "w" and the values of the biases "b" in the neural network. This backpropagation method is known. Therefore, the backpropagation method will be simply explained below in outline. Note that, a bias "b" is a type of weight "w", therefore in the following explanation, a bias "b" is deemed to be one of the weights "w". Now then, in a neural network such as shown in FIG. 3, if expressing the weights at the input values $u^{(L)}$ to the nodes of the different layers of L=2, L=3, or L=4 as $w^{(L)}$, the differential of the error function E by the weight $w^{(L)}$, that is, the gradient $\partial E/\partial w^{(L)}$, can be rewritten as shown in the following equation:

$$\partial E/\partial w^{(L)} = (\partial E/\partial u^{(L)})(\partial u^{(L)}/\partial w^{(L)}) \quad (1)$$

where, $z^{(L-1)} \cdot \partial w^{(L)} = \partial u^{(L)}$, therefore if $(\partial E/\partial u^{(L)}) = \delta^{(L)}$, the above equation (1) can be expressed by the following equation:

$$\partial E/\partial w^{(L)} = \delta^{(L)} \cdot z^{(L-1)} \quad (2)$$

In this regard, if $u^{(L)}$ fluctuates, fluctuation of the error function E is caused through change of the total input value $u^{(L+1)}$ of the next layer, therefore $\delta^{(L)}$ can be represented by the following equation (K is the number of nodes at the L+1 layer).

$$\delta^L = (\partial E/\partial u^{(L)}) = \sum_{k=1}^{K} (\partial E/\partial u_k^{(L+1)})(\partial u_k^{(L+1)}/\partial u^{(L)}) \quad (3)$$

$$(k = 1, 2, \ldots, K)$$

where, if $z^{(L)} = f(u^{(L)})$, the input value $u_k^{(L+1)}$ appearing at the right side of the above equation (3) can be expressed by the following equation:

$$u_k^{(L+1)} = \sum_{k=1}^{K} w_k^{(L-1)} \cdot z^{(L)} = \sum_{k=1}^{K} w_k^{(L+1)} \cdot f(u^{(L)}) \quad (4)$$

where, the first term $(\partial E/\partial u^{(L+1)})$ at the right side of equation (3) is $\delta^{(L+1)}$, and the second term $(\partial u_k^{(L+1)}/\partial u^{(L)})$ of the right side of equation (3) can be expressed by the following equation:

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \quad (5)$$

Therefore, $\delta^{(L)}$ is shown by the following equation:

$$\delta^{(L)} = \sum_{k=1}^{K} w_k^{(L+1)} \cdot \delta^{(L+1)} \cdot f'(u^{(L)})$$

That is, $$\delta^{(L-1)} = \sum_{k=1}^{K} w_k^{(L)} \cdot \delta^{(L)} \cdot f'(u^{(L-1)}) \quad (6)$$

That is, if $\delta^{(L+1)}$ is obtained, it is possible to obtain $\delta^{(L)}$. Now then, in the case where the set of training data including a certain input value "x" and the correct answer data of the output $y_t$ for that input value "x" is obtained and the output value from the output layer for the input value is "y", if the squared error is used as the error function, the squared error E is obtained by $E=\frac{1}{2}(y-y_t)^2$. In this case, at the node of the output layer (L=4) of FIG. 3, the output value $y=f(u^{(L)})$. Therefore, in this case, the value of the $\delta^{(L)}$ at the node of the output layer (L=4) is represented by the following equation:

$$\delta^{(L)}=\partial E/\partial u^{(L)}=(\partial E/\partial y)(\partial y/\partial u^{(L)})=(y-y_t)\cdot f'(u^{(L)}) \quad (7)$$

In this regard, in the present embodiment, as explained above, $f(u^{(L)})$ is an identity function and $f'(u^{(L1)})=1$. Therefore, $\delta^{(L)}=y-y_t$ and $\delta^{(L)}$ are obtained.

If $\delta^{(L)}$ is obtained, the above equation (6) is used to obtain the $\delta^{(L-1)}$ of the previous layer. In this way the $\delta$ of the previous layer are successively obtained. Using the values of $\delta$, from the above equation (2), the differential of the error function E, that is, the gradient $\partial E/\partial w^{(L)}$, is obtained for the weights "w". If the gradient $\partial E/\partial w^{(L)}$ is obtained, this gradient $\partial E/\partial w^{(L)}$ is used to update the values of the weights "w" so that the value of the error function E is decreased. That is, the values of the weights "w" are trained.

<<Example of Specific Model>>

Figure 4:
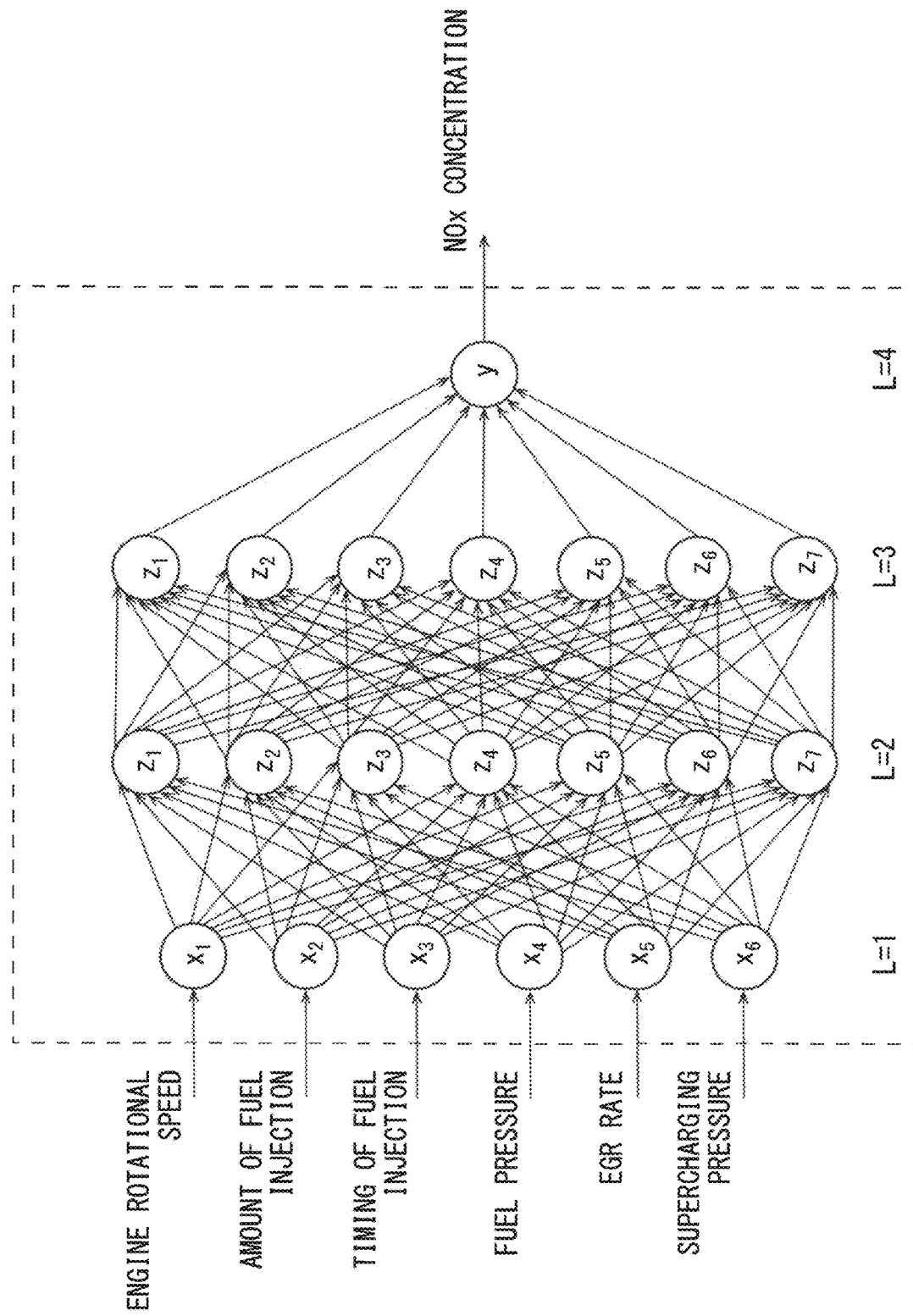
FIG. 4 is a view showing an example of a neural network.

Next, referring to FIG. 4, an example of a specific model using a neural network will be explained. FIG. 4 is a view showing one example of a neural network used in the computing part 82 of the present embodiment.

As shown in FIG. 4, the neural network shown in FIG. 4 has an input layer (L=1), two hidden layers (L=2, 3), and an output layer (L=4). Further, in the neural network shown in FIG. 4, the input layer (L=1) is provided with six nodes, the output layer (L=4) is provided with one node, and the hidden layers (L=2, 3) are respectively provided with seven nodes. However, the neural network may have any number of layers of equal to or greater than three layers. Further, the number of nodes of each layer may be any number.

In the present embodiment, at each node of the input layer (L=1), the value of a specific input parameter expressing the operating state of the internal combustion engine 1 is input. In particular, at each node of the input layer (L=1), the value of a single input parameter different from the input parameters input to other nodes of the input layer (L=) is input. In the example shown in FIG. 4, the input parameters include, specifically, the rotational speed of the internal combustion engine 1, the amount of fuel injection and timing of fuel injection from the fuel injector 21, the pressure of the fuel fed to the fuel injector 21 (fuel pressure), the EGR rate, and the supercharging pressure.

In addition, in the present embodiment, the output layer (L=4) has only one node. From this node, the value of one output parameter (estimated value) is output. In the example shown in FIG. 4, the output parameter corresponds to the concentration of NOx in the exhaust gas discharged from the internal combustion engine 1 (that is, the exhaust gas before flowing into the filter 44).

Therefore, in the neural network shown in FIG. 4, if the current values of the engine rotational speed, amount of fuel injection, timing of fuel injection, fuel pressure, EGR rate and supercharging pressure are input as values of the input parameters, the estimated value of the NOx concentration (current estimated value or future estimated value) is output as the value of the output parameter.

Therefore, if receiving as input the values of the above-mentioned input parameters during the operation of the internal combustion engine 1, the computing part 82 utilizes the model using the neural network to calculate the value of the output parameter. Specifically, the computing part 82 inputs the values of the parameters input to the computing part 82 into the input layer of the neural network and outputs the value of the output parameter output from the output layer of the neural network.

The values of the input parameters input to the computing part 82 are acquired by the parameter value acquiring part 81. Specifically, the engine rotational speed is calculated by the ECU 61 based on the output of the crank angle sensor 79. The parameter value acquiring part 81 acquires the thus calculated engine rotational speed from the ECU 61. The amount of fuel injection and the timing of fuel injection can be grasped from the command values output from the ECU 61 through the output port to the fuel injector 21, therefore the parameter value acquiring part 81 acquires the amount of fuel injection and the timing of fuel injection based on the command values to the fuel injector 21. The fuel pressure is detected by the fuel pressure sensor 74, therefore the parameter value acquiring part 81 acquires the fuel pressure based on the output value of the fuel pressure sensor 74.

The EGR rate cannot be directly measured, therefore is estimated from various types of parameters related to the EGR rate by known methods. For example, it is estimated at the ECU 61 based on the opening degree of the EGR control valve 52, the pressure of the intake gas in the intake manifold 31, the pressure of the exhaust gas in the exhaust manifold 41, etc. The parameter value acquiring part 81 acquires the thus estimated EGR rate from the ECU 61. The supercharging pressure is detected by the supercharging pressure sensor 73, but the parameter value acquiring part 81 acquires the supercharging pressure based on the output value of the supercharging pressure sensor 73.

The current values of the input parameters acquired by the parameter value acquiring part 81 in this way are input to the computing part 82. As a result, the estimated value of the NOx concentration, which is the output parameter, is output from the computing part 82.

Further, the thus configured neural network is trained (that is, the values of the weights "w" and the values of the biases "b" are learned) before mounting in the vehicles. In training the neural network, a large number of sets of training data including measured values of input parameters and measured values of output parameters corresponding to the measured values of input parameters (correct answer data) are prepared. The thus prepared sets of training data are used to repeatedly update values of the weights "w" and biases "b" in the neural network, by using the above-mentioned backpropagation method whereby the values of the weights "w" and biases "b" are learned.

The neural network using the values of the weights "w" and biases "b" learned in advance in this way is mounted in a vehicle. Therefore, at the computing part 82 of the vehicle, the trained model trained in advance is used to calculate the estimated value of the NOx concentration.

Figure 5:
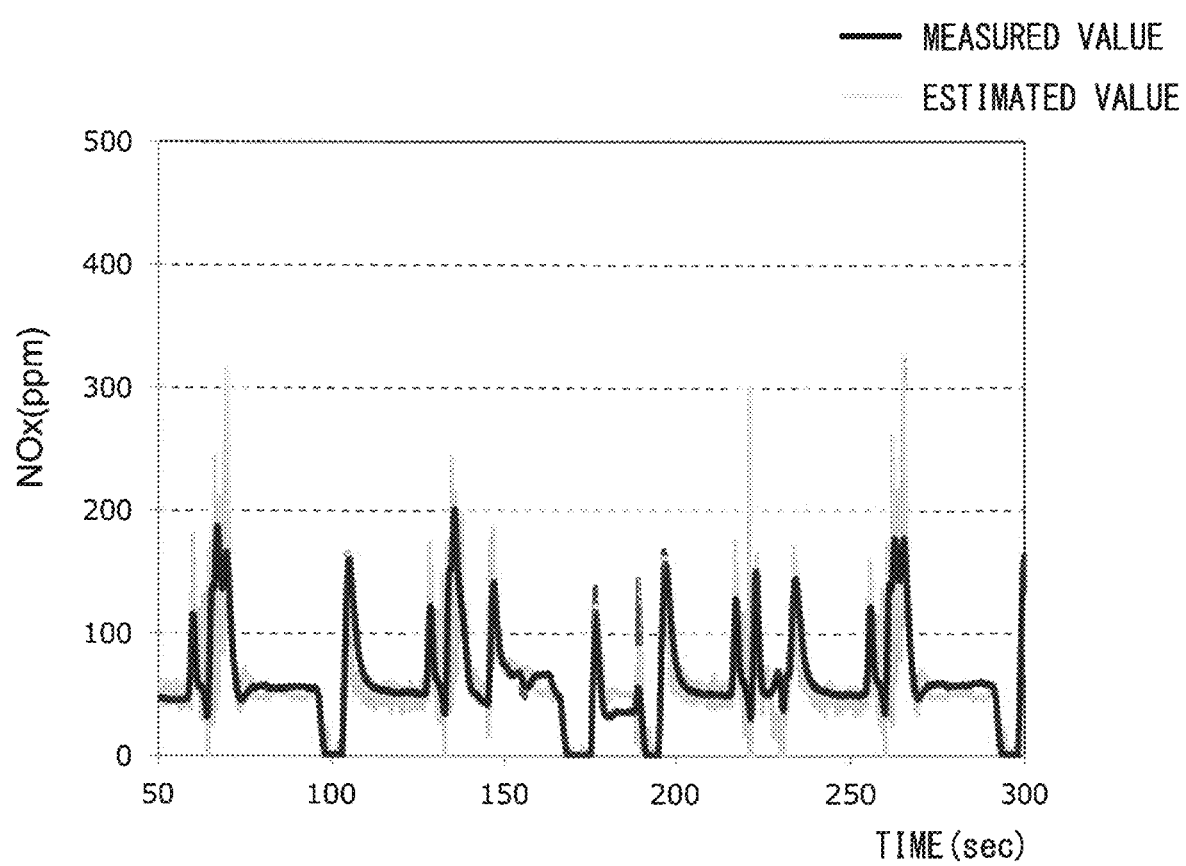
FIG. 5 is a time chart of an estimated value of a NOx concentration calculated utilizing a trained model and a measured value of a NOx concentration.

By utilizing the trained model trained in this way to estimate the value of the output parameter of the NOx concentration, it is possible to estimate the NOx concentration with a relatively high accuracy. FIG. 5 is a time chart of the estimated value of the NOx concentration calculated utilizing the trained model actually trained by the above-mentioned method and the measured value of the NOx concentration. In particular, FIG. 5 shows the trends in the estimated value and measured value of the NOx concentration over a certain time period (300 seconds), when suitably changing the operating state of the internal combustion engine 1.

From FIG. 5, it will be understood that by suitably training the values of the weights "w" and biases "b" in the neural network, the value estimated by the trained model becomes a value relatively close to the measured value. In the example shown in FIG. 5, the correlation coefficient between the estimated value and measured value of the NOx concentration was 0.82. Therefore, it is possible to estimate the output parameter of the NOx concentration with a high accuracy.

<<Abnormality in Input Parameters>>

In this regard, the values of part of the input parameters to the above-mentioned neural network (for example, the supercharging pressure and engine rotational speed) are directly detected by various types of sensors or are calculated at the ECU 61 based on the values of the various types of sensors. Therefore, if a sensor used for detection or calculation of the value of an input parameter breaks down and the sensor outputs an abnormal value, an abnormality also occurs in the value of the input parameter. That is, a large error occurs between the actual value of the input parameter and the value of the input parameter input to the neural network.

Further, the values of part of the input parameters to the above-mentioned neural network (for example, amount of fuel injection and timing of fuel injection) are command values to various types of actuators. Therefore, if an actuator breaks down and the actuator does not operate as in the command value, an abnormality occurs in the value of the input parameter as well. That is, in this case as well, a large error occurs in the actual value of the input parameter and the value of the input parameter input to the neural network. For example, if the fuel injector 21 breaks down and the actual amount of fuel injection from the fuel injector 21 differs from the command value, the amount of fuel injection input to the neural network is an abnormal value different from the actual amount of fuel injection.

Figure 6:
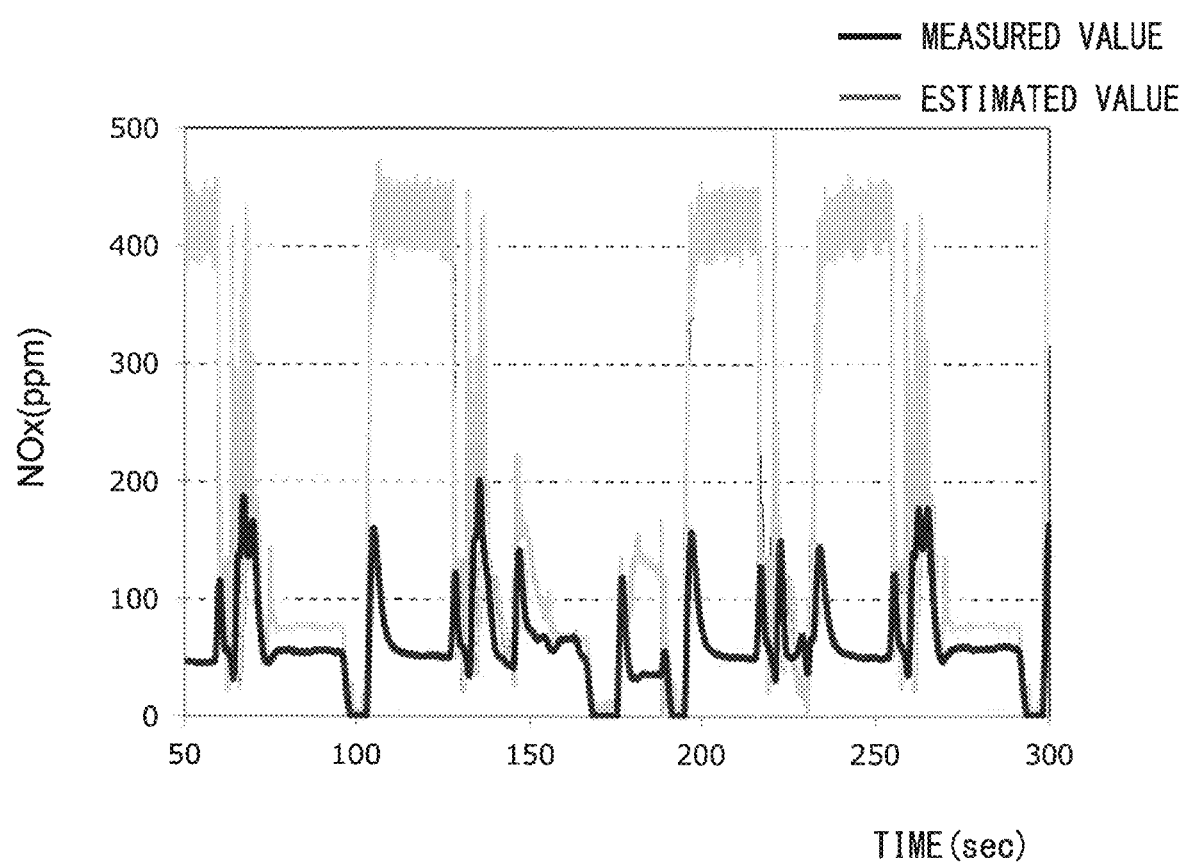
FIG. 6 is a time chart, similar to FIG. 5, of an estimated value of a NOx concentration calculated utilizing a trained model and a measured value of a NOx concentration.

If an abnormality occurs in the values of part of the input parameters of the neural network in this way, the value of the output parameter can no longer be estimated with a high accuracy. FIG. 6 is a time chart, similar to FIG. 5, of the estimated value of the NOx concentration calculated utilizing the trained model actually trained by the above-mentioned method and the measured value of the NOx concentration. FIG. 6 shows the case when an abnormality occurs in the supercharging pressure sensor 73 and the supercharging pressure input to the neural network has a large error from the actual value.

From FIG. 6, it will be understood that if an abnormality occurs in the output value of the supercharging pressure sensor 73 and an abnormality occurs in the value of the supercharging pressure input to the neural network, the estimated value obtained by the trained model becomes a value deviated from the measured value. In the example shown in FIG. 6, the correlation coefficient of the estimated value and measured value of the NOx concentration was 0.087. Therefore, it will be understood that if an abnormality occurs in the values of part of the input parameters, the accuracy of estimation of the output parameter of the NOx concentration greatly deteriorates.

<<Method of Estimation at Time of Abnormality>>

Therefore, in the present embodiment, when an abnormality occurs in the values of part of the input parameters, the computing part 82 corrects the model so that values changing in accordance with the values of the abnormal input parameters are not input from the nodes of the input layer, corresponding to the abnormal input parameters where an abnormality occurred, to the nodes of the hidden layers, and uses the corrected model to calculate the value of the output parameter. Below, referring to FIG. 7, a corrected model used in the computing part 82 of the present embodiment will be explained.

Figure 7:
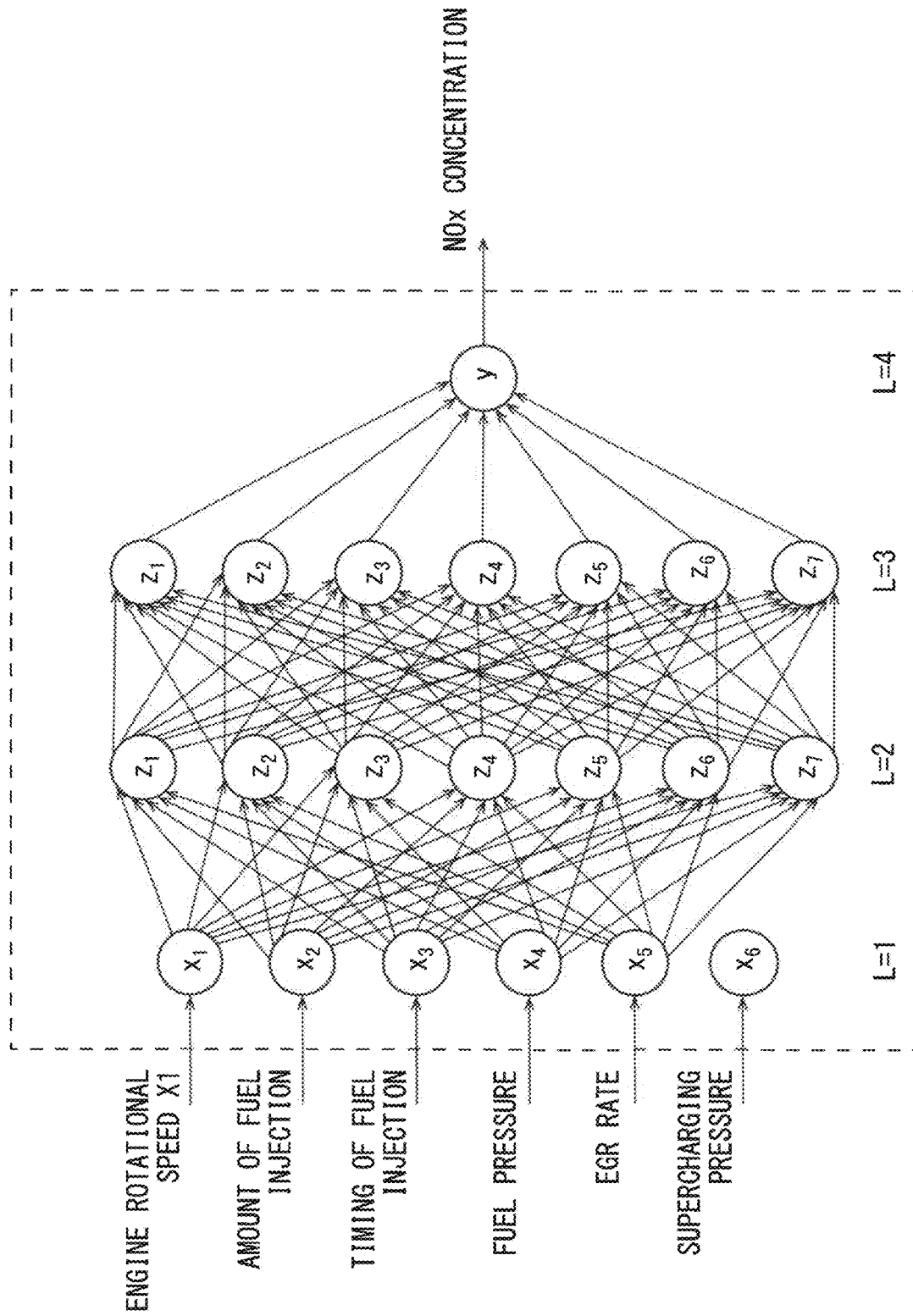
FIG. 7 is a view, similar to FIG. 4, showing an example of a neural network in a corrected model.

FIG. 7 is a view, similar to FIG. 4, showing one example of the neural network in a corrected model. The corrected model using the neural network shown in FIG. 7 is obtained by correcting the model using the neural network shown in FIG. 4. Further, FIG. 7 shows the case where an abnormality occurs in the supercharging pressure sensor 73, therefore, the case where an abnormality occurs in the input value of the supercharging pressure, which is one of the input parameters.

The neural network shown in FIG. 7 also has the same network structure as the neural network shown in FIG. 4. Therefore, the neural network shown in FIG. 7 has the input layer (L=1), two hidden layers (L=2, 3), and the output layer (L=4). Each layer has the same number of nodes as the neural network shown in FIG. 4. Further, an input parameter similar to the neutral network shown in FIG. 4 is input to each node of the input layer.

However, in the example shown in FIG. 7, at the node of the input layer (L=1), to which is input the value of the supercharging pressure at which an abnormality occurs among the large number of input parameters, the output value $x_6$ is substantially not input to the nodes of the hidden layer (L=2). Specifically, for example, the output value of the node of the input layer (L=1), to which the value of the supercharging pressure is input, is multiplied with zero as the weight "w" and then input to the nodes of the hidden layer (L=2). Therefore, the layers downward from the hidden layer (L=2) are not affected by the output of the node of the input layer (L=1) to which the value of the supercharging pressure is input. That is, even if value is input to the node $x_6$ of the input layer (L=1) as the supercharging pressure, the value of the output parameter output from the node of the output layer (L=4) (NOx concentration) does not change.

Figure 8:
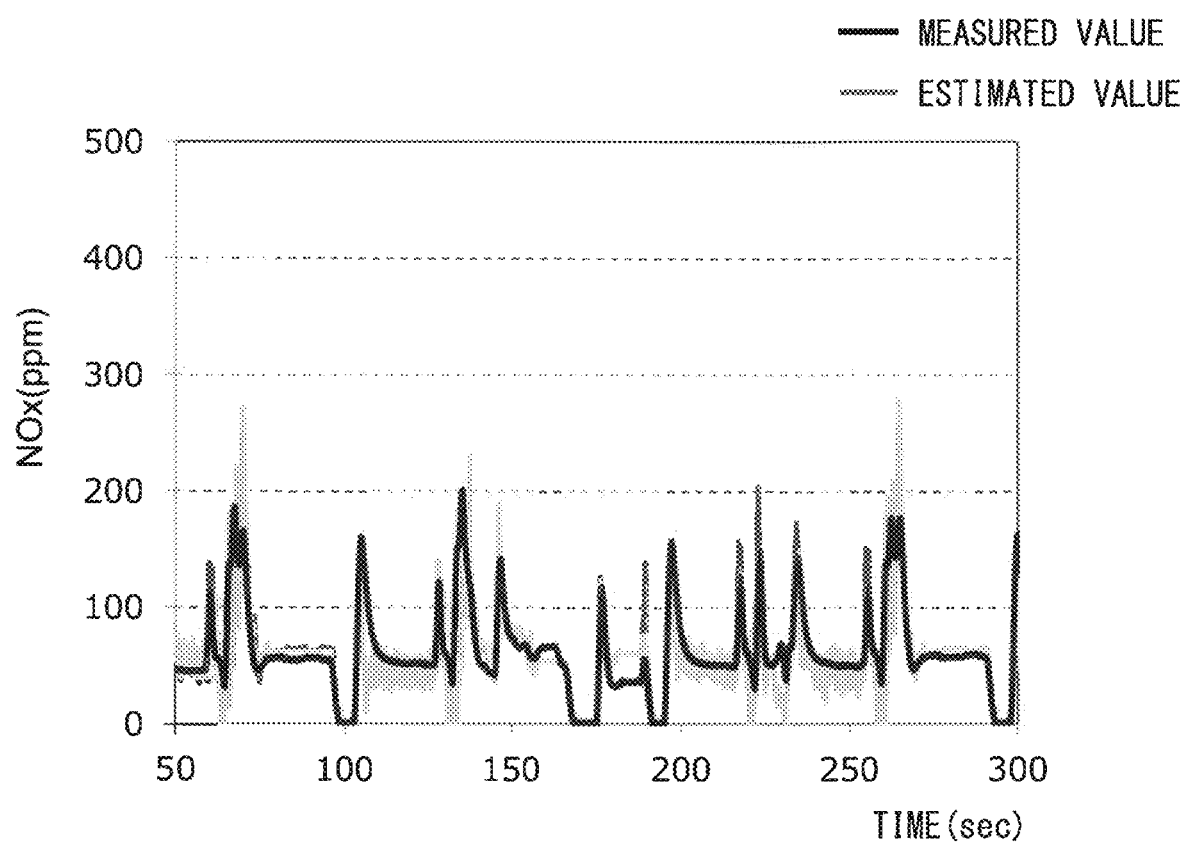
FIG. 8 is a time chart, similar to FIGS. 5 and 6, of an estimated value of a NOx concentration calculated utilizing a corrected model and a measured value of a NOx concentration.

FIG. 8 is a time chart, similar to FIGS. 5 and 6, of the estimated values of the NOx concentration calculated using the corrected model such as shown in FIG. 7 and the measured values of the NOx concentration. In particular, FIG. 8 shows the case of using, as the corrected model, a model trained using a set of training data similar to the set of training data used when preparing the above-mentioned trained model.

As will be understood from FIG. 8, it will be understood that even using a corrected model in which, for an abnormal input parameter, the output value of the corresponding node of the input layer (L=1) is substantially not input to the nodes of the hidden layer (model such as shown in FIG. 7), the estimated value is a value relatively close to the measured value. In the example shown in FIG. 8, the correlation coefficient between the estimated value and measured value of the NOx concentration was 0.81. Therefore, it will be understood that even in the corrected model, it is possible to estimate the output parameter of the NOx concentration with a relatively high accuracy.

That is, in the model using a neural network such as shown in FIG. 4, even if part of the abnormal input parameters are not used, by training the model in a state eliminating the abnormal input parameters, it is possible to estimate the value of the output parameter by a relatively high accuracy. Therefore, according to the present embodiment, even if an abnormality occurs in values of part of the input parameters, it is possible to estimate the value of the output parameter with a relatively high accuracy.

Note that, in the above embodiment, in the corrected model, the output value of a node, to which a value of an abnormal input parameter is input, is multiplied with zero as the weight "w", and the multiplied value is input to the nodes of the hidden layer (L=2). However, so long as a value changing in accordance with the value of the abnormal input parameter is not input from the node of the input layer corresponding to the abnormal input parameter to the nodes of the hidden layer, other techniques may be used to correct the model as well. For example, the model may also be corrected so that zero is input to the node of the input layer corresponding to the abnormal input parameter. Alternatively, the model may also be corrected so that any constant value not changing in accordance with the value of the abnormal input parameter is input to the node of the input layer corresponding to the abnormal input parameter.

<<Training Technique of Corrected Model>>

As explained above, the corrected model has to be trained, but this training of the corrected model is performed by the learning part 84 of the ECU 61. Therefore, in the present embodiment, the corrected model is trained in the ECU 61 mounted in each vehicle.

In the present embodiment, a large number of sets of training data similar to the set of training data used when preparing the trained model are stored in the storage part 63. Each set of training data shows the relationship between the values of all of the input parameters and the value of the output parameter corresponding to the values of these input parameters. Therefore, each set of training data includes the values of all of the input parameters and the measured value (correct answer data) of the output parameter when the values of the input parameters are set to those values. The training data is prepared in advance before shipment of the vehicle mounting the internal combustion engine 1.

Further, if an abnormality occurs in the values of part of the input parameters of the neural network, the above-mentioned corrected model is prepared in the computing part 82. Specifically, for example, as explained above, the weights "w" multiplied with the output values from the nodes of the input layer, to which abnormal input parameters are input, are all fixed at zero.

The learning part 84 uses the sets of training data stored in the storage part 63 to train the corrected model prepared in this way. Specifically, the learning part 84 uses the sets of training data stored in the storage part 63 to repeatedly update the values of the weights "w" and biases "b" in the neural network by the above-mentioned backpropagation method. However, at this time, the above-mentioned weights "w" fixed at zero are maintained as they are as zero without being updated. In the computing part 82, the corrected model trained at the learning part 84 in this way is used to calculate the estimated value of the NOx concentration.

In the present embodiment, the sets of training data stored in the storage part 63 in this way are used to train the corrected model. Therefore, compared to the case of storing a corrected model (more accurately, weights "w" and biases "b") in the storage part 63 for each input parameter at which an abnormality occurred and for each combination of input parameters at which an abnormality occurred, it is possible to reduce the required storage capacity of the storage part 63.

However, the storage part 63 may also store a trained corrected model (more accurately, weights "w" and biases "b") for each input parameter at which an abnormality occurred and for each combination of input parameters at which an abnormality occurred. In this case, when an abnormality occurs in the values of part of the input parameters and the above-mentioned corrected model is prepared in the computing part 82, as the values of the weights "w" and the biases "b" of the corrected model, the learned values of the weights "w" and the biases "b" of the corresponding model stored in the storage part 63 are used. By storing trained corrected models in the storage part 63 in this way, it is no longer necessary to train a corrected model when using the corrected model and it becomes possible to quickly use a corrected model.

<<Flow Chart>>

Figure 9:
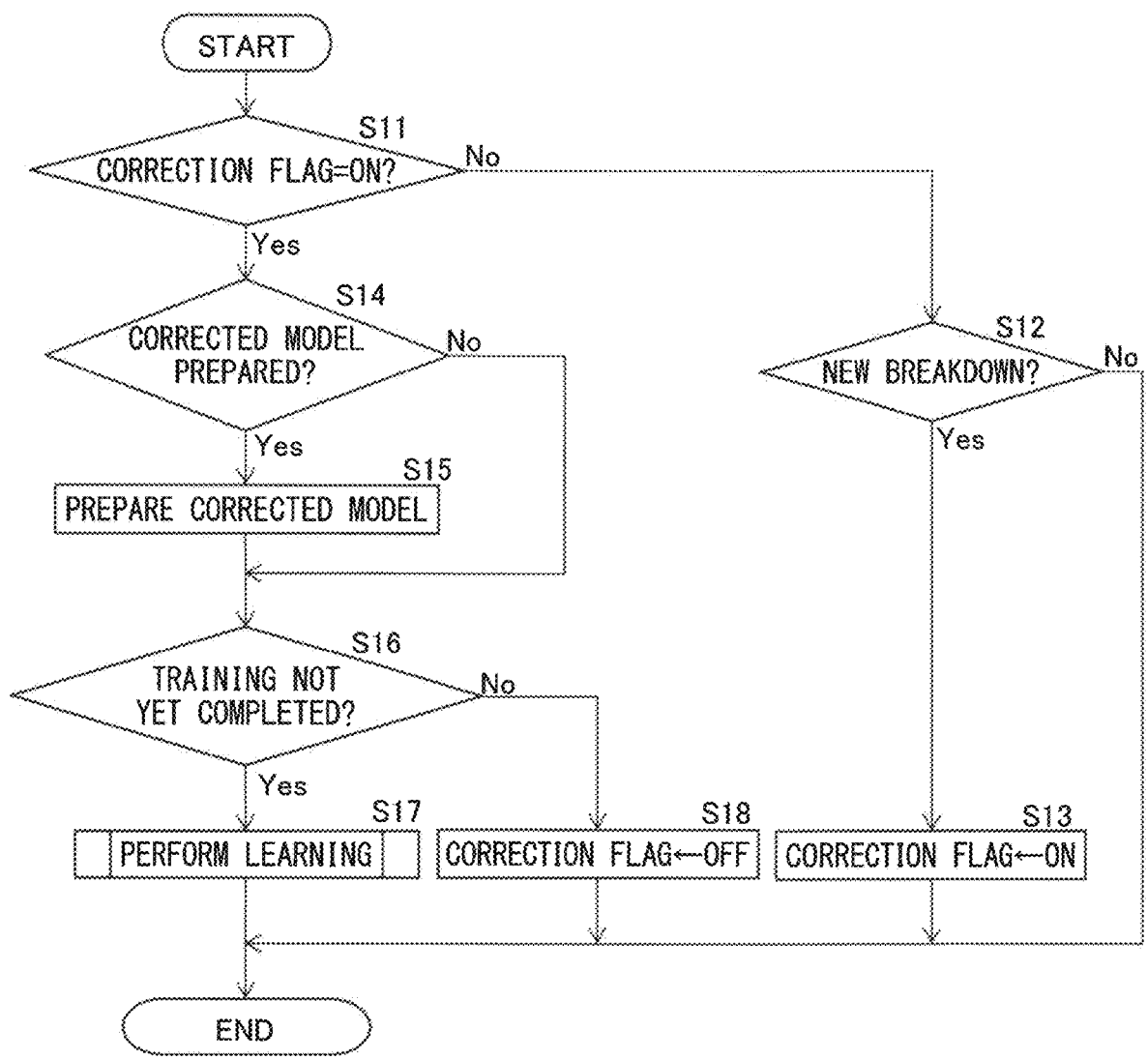
FIG. 9 is a flow chart showing a control routine of control for correction of a model performed by the control device of the internal combustion engine.

FIG. 9 is a flow chart showing a control routine of control for correction of a model performed by the control device of the internal combustion engine 1 according to the present embodiment. The illustrated control routine is performed every certain time interval.

First, at step S11, it is judged if a correction flag is ON. A correction flag is a flag which is set ON when correcting a model (in particular, the weights or biases of the model) along with a breakdown of various sensors or actuators and is set OFF when otherwise. If at step S11 it is judged that the correction flag is not ON, the control routine proceeds to step S12.

At step S12, it is judged if any one of the various sensors or actuators used for detecting or calculating the input parameters of the model newly breaks down. A breakdown of the various sensors or actuators is detected by a known method. If at step S12 it is judged that none of the various sensors and actuators have newly broken down, the control routine is ended. On the other hand, if at step S12 it is judged that a new breakdown has occurred, the control routine proceeds to step S13. At step S13, the correction flag is set to ON and the control routine is ended.

If the correction flag is set ON, at the next control routine, the control routine proceeds from step S11 to step S14. At step S14, it is judged if a corrected model for handling an abnormality in the values of part of the input parameters accompanying breakdown of the various sensors or actuators has been prepared. If a corrected model has not been prepared, the control routine proceeds to step S15.

At step S15, a corrected model is prepared at the computing part 82. Specifically, as explained above, the weights from the input layer (L=1) to the hidden layer (L=2), related to the abnormal input parameters, are fixed at zero.

Next, at step S16, it is judged if the corrected model prepared at step S15 has finished being trained. If at step S16 it is judged that the corrected model has not finished being trained, the control routine proceeds to step S17. At step S17, as explained above, the set of training data stored in the storage part 63 is used to train the corrected model at the learning part 84 and the control routine is ended.

After that, if the corrected model finishes being trained at the learning part 84, at the next control routine, the control routine proceeds from step S16 to step S18. At step S18, the correction flag is reset to OFF and the control routine is ended.

Second Embodiment

Next, a control device of an internal combustion engine according to a second embodiment will be explained. The configuration and control of the control device according to the second embodiment are basically similar to the configuration and control of the control device according to the first embodiment. Therefore, below, parts different from the control device according to the first embodiment will be focused on in the explanation.

In the control device of the first embodiment, sets of training data for training a corrected model were stored in advance in the storage part 63. However, to suitably perform the training in a corrected model, an extremely large number of sets of training data are necessary, therefore to store the sets of training data, it was necessary to make the storage capacity of the storage part 63 larger.

As opposed to this, the control device according to the present embodiment is provided with an output parameter detection device detecting or estimating the value of the output parameter. The learning part 84 uses the values of the input parameters acquired by the parameter value acquiring part 81 and the value of the output parameter detected or estimated by the output parameter detection device, as a set of training data for training the corrected model.

Figure 10:
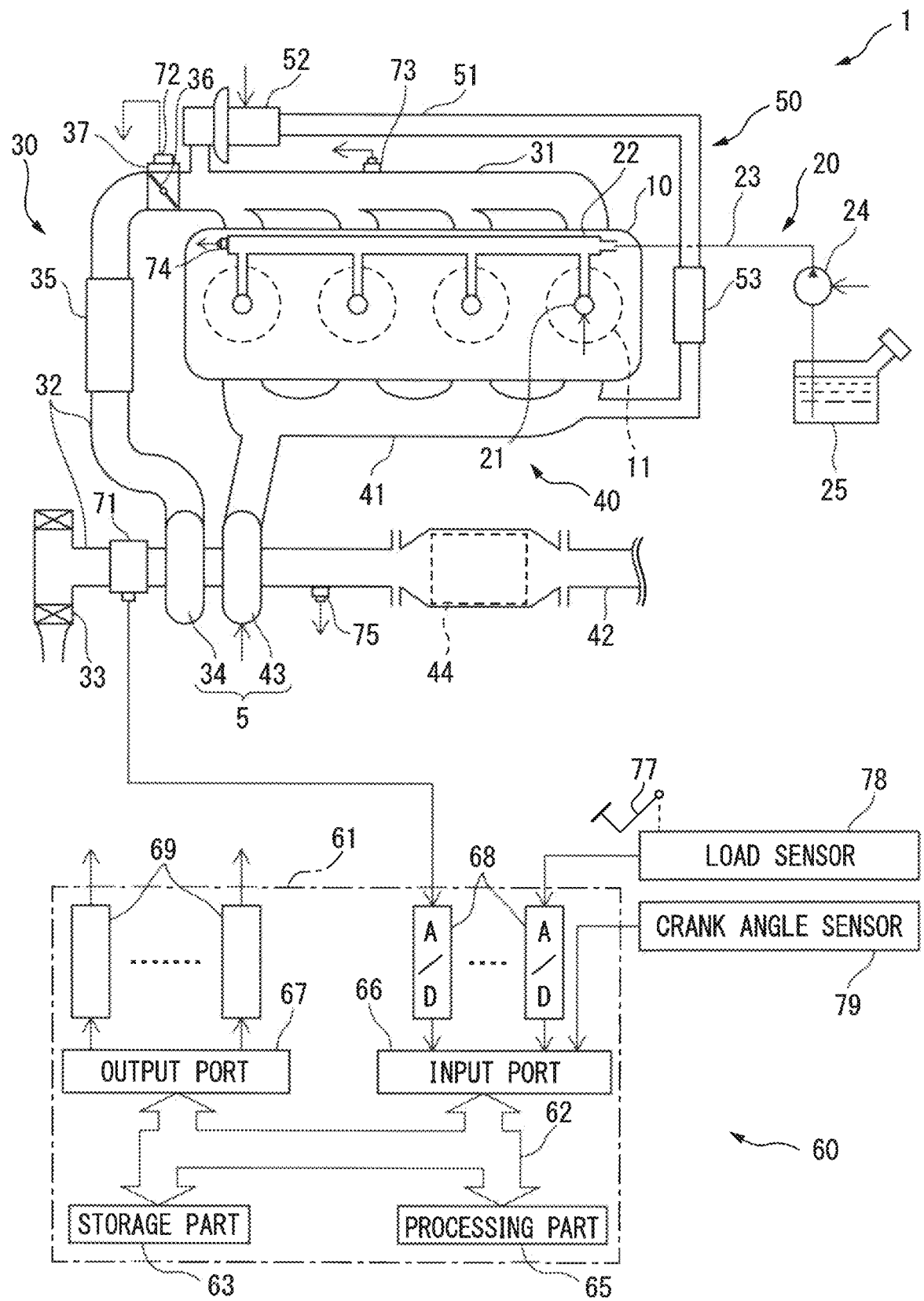
FIG. 10 is a schematic view of the configuration of an internal combustion engine according to a second embodiment.

FIG. 10 is a schematic view of the configuration of the internal combustion engine 1 according to the second embodiment. As shown in FIG. 10, in the internal combustion engine 1 according to the present embodiment, the exhaust manifold 41 or the exhaust pipe 42 is provided with an NOx sensor 75 detecting the concentration of NOx in the exhaust gas discharged from the engine body 10. The output of this NOx sensor 75 is input through the corresponding AD converter 68 to the input port 66. As explained above, the NOx concentration is the output parameter of the computing part 82, therefore the NOx sensor 75 can be said to be an output parameter detection device detecting a value of the output parameter.

The parameter value acquiring part 81 acquires the measured value of the thus detected or estimated output parameter. Specifically, the parameter value acquiring part 81 acquires the output of the NOx sensor 75, as the measured value of the output parameter, through the input port 66 of the ECU 61. Therefore, in the present embodiment, the parameter value acquiring part 81 also functions as an output parameter value acquiring part acquiring the measured value of the output parameter.

The learning part 84 prepares a set of training data from the measured value of the NOx concentration detected in this way and the measured values of the input parameters when the measured value of this NOx concentration is detected. The learning part 84 prepares a set of training data each time the operating state of the internal combustion engine 1 changes. Therefore, the learning part 84 prepares a large number of sets of training data.

Further, the learning part 84 uses the sets of training data prepared in this way to train a corrected model. Specifically, the learning part 84 uses the sets of training data prepared in this way to repeatedly update the values of the weights "w" and biases "b" in the neural network by the above-mentioned backpropagation method. In this way, the values of the weights "w" and biases "b" in the neural network are trained. Note that, at this time as well, in the same way as the above-mentioned first embodiment, the weights "w" fixed at zero are maintained as they are as zero without being updated. The computing part 82 uses the corrected model trained at the learning part 84 in this way to calculate the estimated value of the NOx concentration.

In the present embodiment, the value detected or estimated by the output parameter detection device detecting or estimating the value of the output parameter is used to prepare a set of training data at the control device. Therefore, according to the present embodiment, there is no need to make the storage part 63 store sets of training data, and it is possible to reduce the required storage capacity at the storage part 63.

Note that, in the model of the present embodiment (including the corrected model), future target values are input as the amount of fuel injection and the timing of fuel injection, which are the input parameters. Therefore, the model in the present embodiment outputs a predicted value of the output parameter of the NOx concentration when these input parameters are set to the target values. The control device controls the internal combustion engine based on the predicted value of the NOx concentration output in this way. Specifically, for example, if the predicted value of the NOx concentration is greater than a predetermined threshold value, it may be considered to retard the target value of the timing of fuel injection.

Third Embodiment

Next, referring to FIG. 11, a control system of an internal combustion engine according to the third embodiment will be explained. The configuration and control of the control device of the internal combustion engine used in the control system according to the third embodiment are basically similar to the configuration and control of the control device according to the first embodiment. Therefore, below, parts different from the control device according to the first embodiment will be focused on in the explanation.

In the control device according to the first embodiment and second embodiment, the learning part 84 of the ECU 61 trains the corrected model. However, in training of the corrected model, the above-mentioned backpropagation method is used for training, therefore it is necessary to repeatedly calculate the gradient obtained by differentiating the error function by each weight and each bias for each set of training data and repeatedly perform this operation for a large number of sets of the training data. Therefore, for the control device to perform training, a high performance CPU, etc., must be used for the control device. Therefore, in the present embodiment, a server provided at the outside of the vehicle trains the corrected model.

Figure 11:
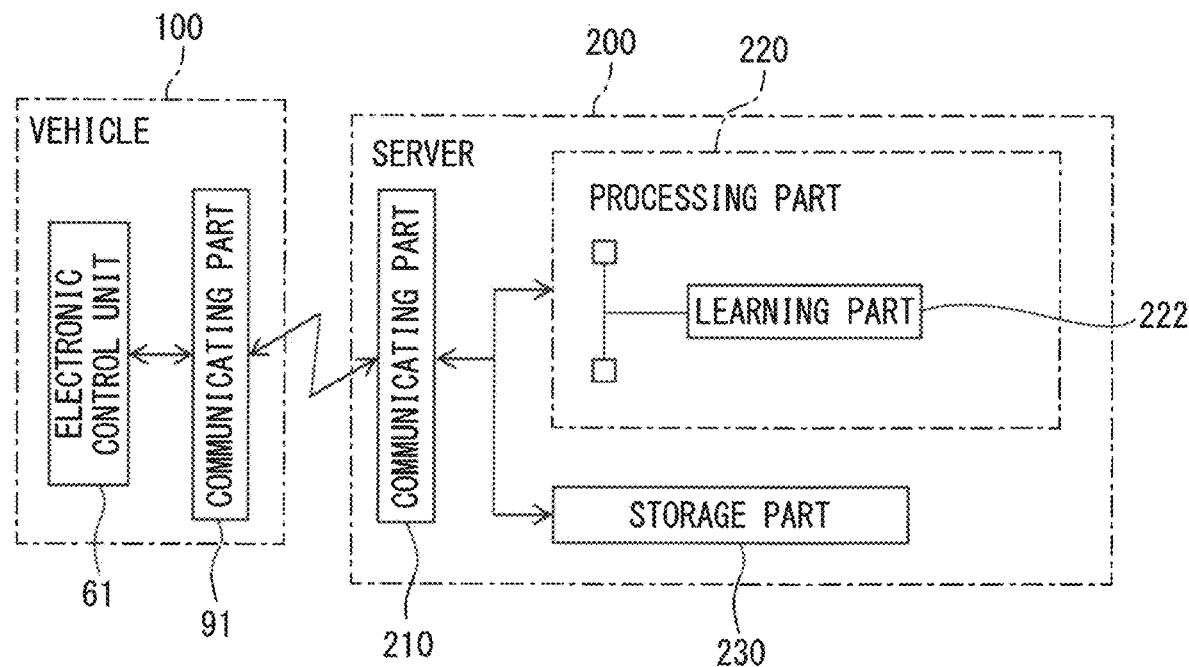
FIG. 11 is a view schematically showing a control system of an internal combustion engine according to a third embodiment.

FIG. 11 is a view schematically showing a control system of an internal combustion engine according to the present embodiment. As shown in FIG. 11, the control device of the internal combustion engine 60 of each vehicle 100 is provided with a communication part 91 connected to an ECU 61. The communication part 91 is connected to the input and output ports of the ECU 61 and therefore can input the input signals to the ECU 61 and can receive output signals from the ECU 61. The communication part 91 of the vehicle 100 is configured so as to communicate with a server 200 provided at the outside of the vehicle 100.

The server 200 provided outside of the vehicle 100 is provided with a communication part 210, processing part 220, and storage part 230. These communication part 210, processing part 220, and storage part 230 are connected with each other and therefore can transfer data with each other.

The communication part 210 communicates with the communication part 91 of each vehicle 100 and transfers data with the communication part 91 of the vehicle 100. The communication between the communication part 91 of the vehicle 100 and the communication part 210 of the server 200 is performed by wireless communications based on various communication standards.

The processing part 220, as shown in FIG. 11, is provided with a learning part 222 as a functional block. The learning part 222 performs training of the corrected model used when calculating the output parameter in the computing part 82 of the vehicle 100. Further, the storage part 230 of the server 200 stores a large number of sets of training data similar to the set of training data used for preparing the trained model, in the present embodiment.

In the present embodiment, if an abnormality occurs in the values of the input parameters of part of the neural network of the vehicle 100, in the same way as the first embodiment, the above-mentioned corrected model is prepared at the computing part 82. Specifically, for example, as explained above, the weights "w" multiplied with the output values from the nodes of the input layer, to which abnormal input parameters are input, are all fixed at zero.

Further, the ECU 61 of the vehicle 100 requests training of the corrected model prepared by the computing part 82 through the communication part 91 to the communication part 210 of the server 200. The processing part 220 of the server 200 performs training of the corrected model at the request of the ECU 61 of the vehicle 100.

The learning part 222 of the processing part 220 uses the sets of training data stored in the storage part 63 for training the corrected model. Specifically, the learning part 222 uses the sets of training data stored in the storage part 230 of the server 200 to repeatedly update the weights "w" and biases "b" in the neural network by the above-mentioned back-propagation method. However, at this time, the above-mentioned weights "w" fixed at zero are maintained as they are as zero without being updated.

If the corrected model finishes being trained at the learning part 222, the corrected model trained in this way (specifically, the data of the weights "w" and the biases "b" of the corrected model trained in this way) is transmitted through the communication part 210 of the server 200 and the communication part 91 of the vehicle to the ECU 61 of the vehicle 100. At the processing part 82 of the ECU 61 of the vehicle 100, the corrected model trained at the learning part 222 of the server 200 in this way is used to calculate the value of the output parameter (in the present embodiment, the estimated value of the NOx concentration).

In the present embodiment, the training of the corrected model is performed at the server 200. Therefore, in the ECU 61 of each vehicle 100, training of the corrected model is not performed. Accordingly, it is possible to reduce the calculation load at the control device of each vehicle 100 and possible to reduce the necessity of a high performance CPU, etc.

Fourth Embodiment

Next, referring to FIG. 11, a control system of an internal combustion engine according to a fourth embodiment will be explained. The configuration and control of the control device of the internal combustion engine used in the control system according to the fourth embodiment are basically similar to the configuration and control of the control device according to the second embodiment. Further, the configuration and control of the control system according to the fourth embodiment are basically similar to the configuration and control of the control system according to the third embodiment. Therefore, below, parts different from the control devices according to the second embodiment and third embodiment will be focused on in the explanation.

In the control system according to the present embodiment, in the same way as the control system of the third embodiment, the corrected model is trained at the server 200. In addition, in the present embodiment, in the same way as the control device of the second embodiment, the set of training data is prepared using the measured values detected or estimated by the output parameter detection device, which detects or estimates the value of the output parameter.

Figure 12:
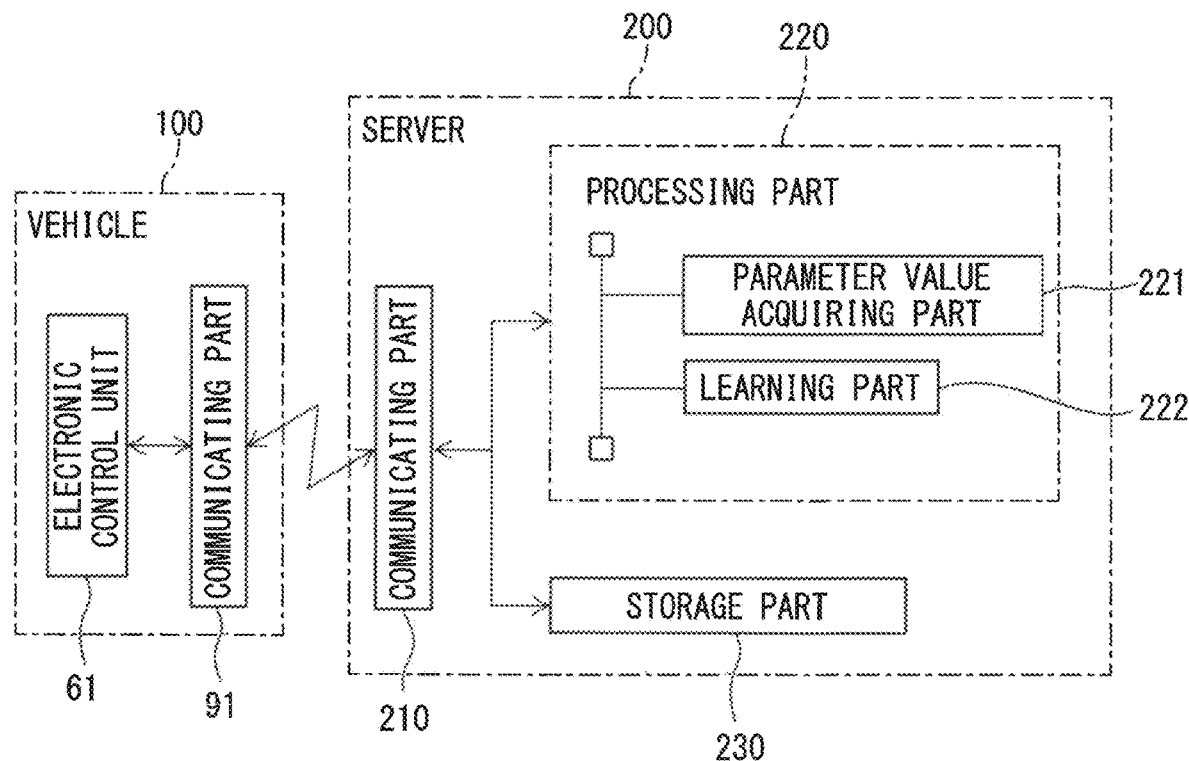
FIG. 12 is a view schematically showing a control system of an internal combustion engine according to a fourth embodiment.

FIG. 12 is a view schematically showing a control system of an internal combustion engine according to the present embodiment. As shown in FIG. 12, the processing part 220 is provided with functional blocks of the parameter value acquiring part 221 and the learning part 222. The parameter value acquiring part 221 of the server 200 acquires values of input parameters showing the operating state of the internal combustion engine 1 from the ECU 61 of the vehicle 100 through the communication part 91 of the vehicle 100 and the communication part 210 of the server 200. In addition, the parameter value acquiring part 221 of the server 200 acquires the measured value of the output parameter detected or estimated by the output parameter detection device through the communication parts 91, 210 from the ECU 61 of the vehicle 100 (for example, the measured value of the NOx concentration from the NOx sensor 75).

In the learning part 222 of the server 200, sets of training data are prepared from the measured values of the input parameters acquired by the parameter value acquiring part 221 in this way and the measured values of the output parameters corresponding to them. In the learning part 222 of the server 200, a set of training data is prepared for each different operating state of the internal combustion engine 1. Therefore, in the learning part 222 of the server 200, a large number of sets of training data are prepared. Further, in the learning part 222 of the server 200, the sets of training data prepared in this way are used for training in the corrected model.

If the corrected model finishes being trained at the learning part 222, the corrected model trained in this way is transmitted through the communication parts 91, 210 to the ECU 61 of the vehicle 100. At the computing part 82 of the ECU 61 of the vehicle 100, the corrected model trained at the learning part 222 of the server 200 in this way is used to calculate the value of the output parameter.

REFERENCE SIGNS LIST 1. internal combustion engine
10. engine body
21. fuel injector
60. control device
61. ECU
63. storage part
65. processing part
73. supercharging pressure sensor
74. fuel pressure sensor
75. NOx sensor
79. crank angle sensor
81. parameter value acquiring part
82. computing part
83. control part
84. learning part

The invention claimed is:

1. A control device of an internal combustion engine, the control device including a digital computer and a memory, the digital computer being configured to:
   acquire values of input parameters showing an operating state of the internal combustion engine;
   utilize a model using a neural network which comprises a plurality of layers including an input layer, a hidden layer, and an output layer to calculate a value of an output parameter when the values of the input parameters are input to the input layer; and
   control operation of the internal combustion engine based on the value of the output parameter calculated by utilizing the model, wherein
   the memory stores a plurality of relationships of the values of all of the input parameters and the value of the output parameter as sets of training data,
   the model is configured to output the value of the output parameter from a node of the output layer when the values of the input parameters are input to nodes of the input layer, each of the nodes of the input layer receiving the value of a different one of the input parameters, and the digital computer is configured so that occurrence of an abnormality in one of the input parameters causes the digital computer to (1) obtain a corrected model which is a version of the model in which a constant output is provided (i) from one of the input nodes that receives the one of the input parameters in which the abnormality occurs (ii) to nodes of the hidden layer, (2) use the sets of training data stored in the memory to train the corrected model, thereby obtaining a trained corrected model, and (3) utilize the trained corrected model to calculate the value of the output parameter.

2. The control device according to claim 1, wherein the constant output from the one of the input nodes that receives the one of the input parameters in which the abnormality occurs is zero.

* * * * *